Nov. 13, 1956          G. M. EDDY          2,770,281
TIRE CHAIN FOR TRACTORS AND HEAVY VEHICLES
Filed Feb. 5, 1954
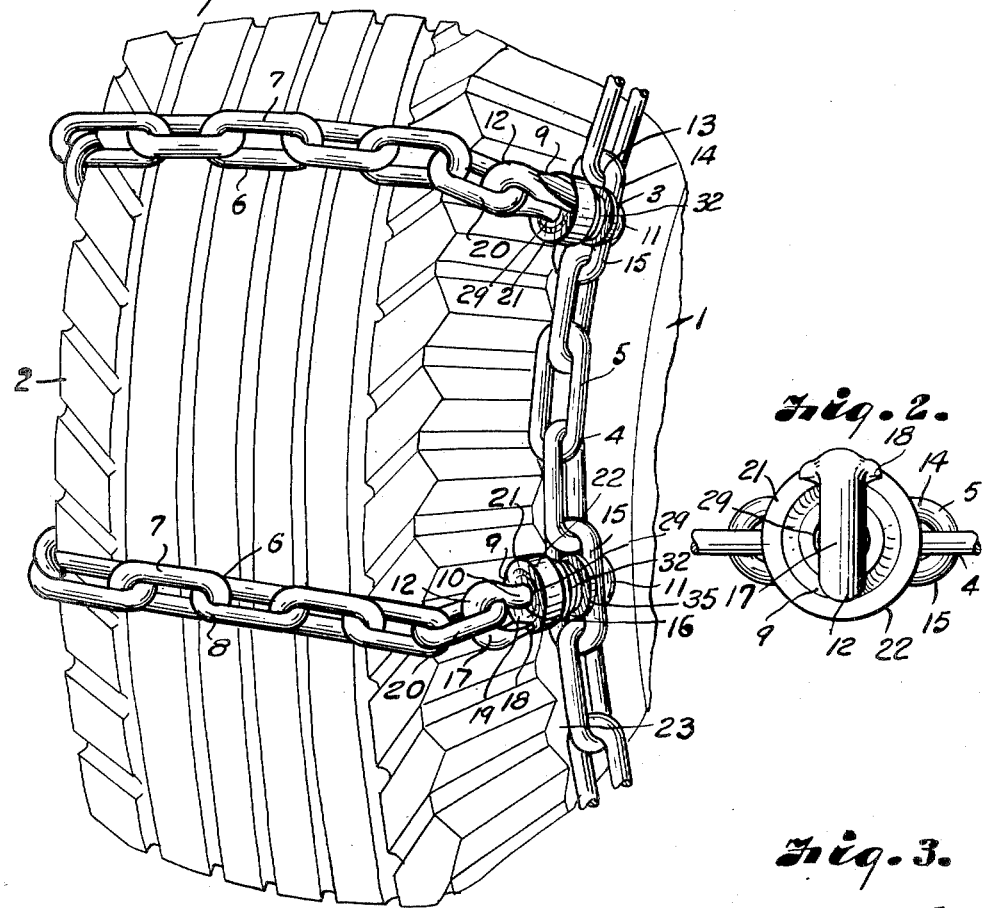
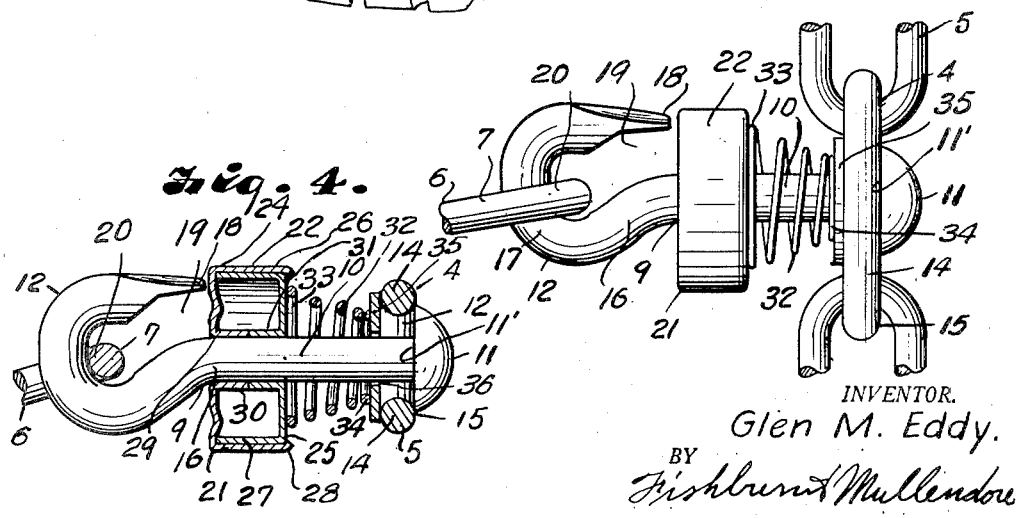
INVENTOR.
Glen M. Eddy.
BY Fishburn & Mullendore
ATTORNEYS.

United States Patent Office 2,770,281
Patented Nov. 13, 1956

2,770,281

TIRE CHAIN FOR TRACTORS AND HEAVY VEHICLES

Glen M. Eddy, Kansas City, Mo., assignor to Roll-O-Matic Chain Company, Kansas City, Mo., a corporation of Missouri Application February 5, 1954, Serial No. 408,319

1 Claim. (Cl. 152—241)

This invention relates to anti-skid devices and more particularly to tire chains of the type disclosed in Patent No. 2,415,583 issued February 11, 1947 and which consists of cross chains that are connected with side chains by swivels with the swivels carrying rollers to facilitate turning of the cross chains.

The principal object of the present invention is to provide a tire chain of this type having simpler construction, fewer parts, and shorter swivels with the swivels being directly connected with the links of the side chains.

Other objects are to provide swivel connections which adapt chains of this type for heavy duty use, for example, on trucks, tractors, snow plows, self-propelled farm machinery and the like where great traction is required; to provide a swivel construction which simplifies assembly; and to provide more freely rotatable swivels.

It is also an object of the invention to provide heavy duty connections between the cross and side chains including light-weight, hollow rollers in position to roll on the smooth sides of heavily treated tires and support the connections for swiveling of the cross chains.

A further object of the invention is to provide truck, tractor, and similar heavy duty chains with readily replaceable cross links.

In acomplishing these and other objects of the invention, I have provided improved structure, the preferred form of which is illustrated in the accompanying drawing wherein:

Fig. 1 is a perspective view of a portion of a truck tire equipped with a tire chain embodying the features of the present invention.

Fig. 2 is an end view of the hook end of one of the swivel connections, as it appears when the cross chain is removed.

Fig. 3 is a side elevational view of one of the swivel connections showing connection with the cross and side chains.

Fig. 4 is a sectional view through the swivel connection with the hook in elevation.

Referring more in detail to the drawings:

1 designates a truck, tractor, or other heavy duty wheel, 2 a heavily treaded tire mounted thereon, and 3, an anti-skid device, which embodies the features of the present invention. The device 3 includes carrier members comprising side chains 4, each including a series of inter-engaged links 5 adapted to be arranged circularly on the respective sides of the tire and which have ends adapted to be connected together by conventional fasteners (not shown). The carrier or side chains 4 are connected at spaced points around the periphery of the tire by cross members 6. While the drawing illustrates only one side of the tire, it is to be understood that a chain 4 is employed at each side of the tire and that the ends of the cross members are connected with the respective side chains in the same manner. The cross members 6 may be of any type such as twisted chain or ordinary chain as illustrated in the drawing.

Each cross chain 6 includes a plurality of links 7 shaped and connected together to provide traction faces 8 on all sides thereof so that no matter which side is presented, ample traction surface is provided when the cross chains turn by reason of swivel connections 9 with the carrier members or side chains 4 as now to be described.

The swivel connections 9 each include a shank element 10 having a head 11 at one end and a hook 12 at the other. The shank 10 is of circular cross section and is of a diameter to extend freely through the space 13 between the side bars 14 of certain of the side chain links 15. The head 11 is integral with the shank and has an annular shoulder 11' of a size to prevent withdrawal of the shank from its link 15 with which it is connected. The outer face of the head is preferably rounded in the form of a rivet. The hook 12 is integrally formed on the other end of the shank by bending the shank laterally in a rounding curve 16, then in a reverse curve 17 terminating in a relatively flat end 18 extending parallel with the shank 10 but spaced from the curved portion 16 to provide an entrance space or passageway 19 for the endmost link 20 of the cross chain 6 that is to be connected thereto.

In order to support the swivel hooks so that the headed ends 11 thereof may swivel within the links 15 of the side chains 4 and allow for turning of the cross chains 6, each of the shanks 10 carry a roller 21 having relatively flat peripheral face 22 adapted to roll upon the side 23 of the tire as shown in Fig. 1. The rollers 21 are of light-weight, hollow construction. Each roller is preferably formed of a pair of cup members 24 and 25 (Fig. 4) having lateral flanges 26 and 27 sleeved one in the other and which are retained in sleeved condition by inwardly flanging the terminal edge of the outermost flange 26 as indicated at 28 in Fig. 4. The central portion of the cup members 24 and 25 are apertured as at 29 and have inwardly abutting flanges 30 to form a hub 31 for mounting the roller on the shank 10 of the swivel hook. Each roller 21 is normally retained in position to close the passageway 19 by a conically coiled spring 32 that is sleeved on the shank 10 with the larger end 33 bearing against the side of the roller 21 and the small end 34 bearing against a washer 35 to exert sufficient pressure between the link of the side chain and the roller to normally support the opposite side of the roller in the position shown in Figs. 3 and 4. The washer 35 has an opening 36 to pass loosely the shank on which it is mounted and the outside diameter is such that opposite diametrical sides thereof lap the side bars 14 of the side chain link 15 to which the shank is connected. The outside diameter of the head 11 and washer 35 are greater than the width of the openings in the link but are preferably no greater than the total width of the side links so that they cannot cut the side of the tire when the chain is in use.

In assembling each swivel connection, shank 10 is in straight form and has only the head 11. The washer 35, spring 32 and roller 21 are sleeved over the shank 10 prior to formation of the hook 12. The hook 12 is then formed to shape with the flat terminal 18 spaced from the shank 10 a sufficient distance to provide the space 19 to readily pass the endmost link 20 of the cross chain 6 that is to be connected thereto.

In attaching the swivel connections to the links 15 of the carrier side chains 5 the bars 14 of those links are spread apart a sufficient distance to pass the heads 11 therebetween after which the links are returned to their former shape. The cross chains 6 are readily connected with the hooks of the swivel connections by drawing the rollers 21 retractively on the shanks 10 of the swivel hooks a sufficient distance to permit passing of the end links 20 of the cross chains over the terminal ends of the hooks after which the wheels are released so that the springs 32 return them to latched position relative to the hooks 12.

Anti-skid chains constructed and assembled as described, are applied to the tire 2 of a wheel 1 in the manner of an ordinary chain, however, by reason of the swivel mounting of the cross chains 6, the chains are easier to apply and adjust themselves very readily to the tire. When the chains are in position on the tire, the cross chains 6 have one of the sides thereof contacting the tread, and the swivel connections are supported in spaced relation with the side faces of the tire by the rollers 21 as shown in Fig. 2. It is thus obvious that the cross chains 6 are free to turn so as to present all sides thereof to the traction surface, thereby greatly increasing the life of the cross chains 6 and increasing the efficiency and performance of the chains 3 on a wheel.

Since the cross chains 6 are free to swivel, the one on the underside of the truck wheel that is engaging between the wheel and the traction surface will roll and cause tightening of the side chains and exert a substantially uniform tension on the other cross chains. The cross chains are thus kept in close contact with the tread of the tire providing a quieter action, smoother operation, and better traction.

When the chains are applied to both rear wheels of a tractor, truck or other vehicle, the chains will automatically adjust themselves to give substantially the same traction on both wheels and the tightening of the chain under operation prevents the wheels from spinning in the chains. The swivel connections of the cross chains also prevent burning or cutting of the tire by the chain.

When the cross links become worn, they are readily removed by moving the rollers 21 retractively against the action of the springs 32 and unhooking the end links of the cross chains. New chains may then be applied by engaging the end links thereof with the swivel hooks. Upon relieving pressure exerted against the rollers, the springs return the rollers to latching position.

Because the chains must be relatively heavy the rollers are of relatively large diameter, therefore the hollow construction thereof is an important feature as it provides a light-weight structure and avoids excessive wear on the shank of the swivel hooks. The direct connection of the swivel hooks with the links of the side chains shortens the swivel connectors and also eliminates extra weight where weight is a factor on heavy duty equipment.

From the foregoing it is obvious that I have provided a truck, tractor or similar heavy duty tire chain that is efficient in operation and wherein the cross links are of longer life since the links are free to turn and present both the sides thereof to the traction surface.

It is also obvious that worn links are readily removed and new cross links applied without the aid of tools.

What I claim and desire to secure by Letters Patent is:

An anti-skid device including cross and carrier side chain members each composed of a series of interconnected links, the links of the carrier side members having side bars spaced apart and providing an opening therebetween, and swivel units connecting endmost links of the cross members with links of the carrier side members, each of said swivel units including a shank extending through an opening between the side bars of a link of the carrier side members and having an axis of rotation, a head integral with one end of said shank and of larger diameter than the space between said side bars to provide an annular shoulder with opposite diametrical portions contacting the respective side bars when the shank turns about its axis within said opening between the bars of the link under rolling movement of the cross members, a hook integral with the other end of said shank and having an entrance way for passing the endmost link of a cross member, a roller slidable on the shank to close said entrance way to the hook, a washer on the shank engaging opposite sides of said bars of the link of said side member, and a spring on said shank having one end engaging the roller and the other engaging the washer to retain yieldingly the shoulder of said head in direct swivelling contact with the side bars of the link and the roller closing the entrance way to the hook.

References Cited in the file of this patent

UNITED STATES PATENTS

| | | |
|---|---|---|
| 1,548,113 | Bridge | Aug. 4, 1925 |
| 2,415,583 | Eddy | Feb. 11, 1947 |
| 2,617,464 | Trumbull | Nov. 11, 1952 |
| 2,664,608 | Beck | Jan. 5, 1954 |